Dec. 24, 1963    H. E. MELTZER    3,115,567
HEAT BLOW GUN
Filed Oct. 13, 1960
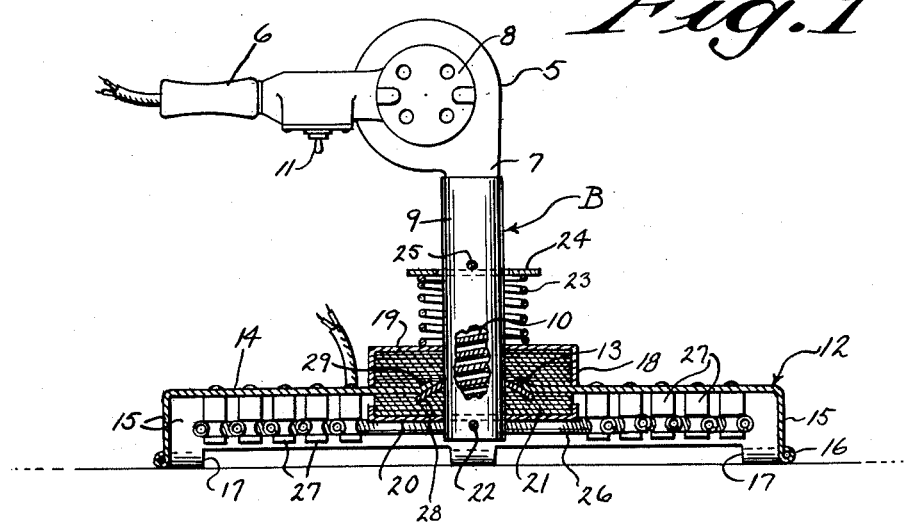
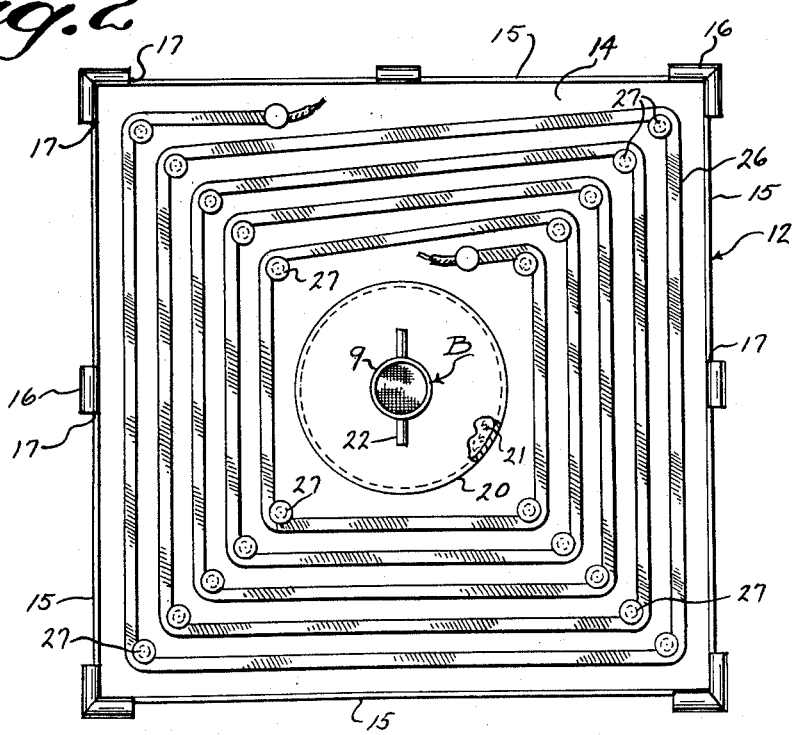
INVENTOR
HENRY E. MELTZER
BY *Wright and Wright*
ATTORNEYS

3,115,567
HEAT BLOW GUN
Henry E. Meltzer, 18th and Flett Sts., Racine, Wis.
Filed Oct. 13, 1960, Ser. No. 62,410
2 Claims. (Cl. 219—39)

This invention appertains to heat guns and more particularly to a novel device for applying a localized heat in the form of a blast of hot air to a specific point for any desired purpose.

One of the primary objects of my invention is to provide a heat blow gun for facilitating the removal of paint from an old surface by applying a blast of hot air to the paint for blistering or melting the paint, so that the paint can be quickly scraped off without burning or otherwise injuring the surface.

Another salient object of my invention is the provision of a heat blow gun having connected to its nozzle a heat retaining pan for engaging over a desired area of a surface for distributing the heat over said surface and confining the heat thereto, whereby to quickly affect the paint or similar surface.

A further important object of my invention is the provision of an electrical heating unit directly within the pan as well as the heating unit in the blow gun nozzle, so as to insure the correct heating of the air over the entire area covered by the pan.

A further important object of the invention is to provide a flexible connection between the pan and nozzle, whereby the pan can conform itself to the inclination of such surface relative to the gun.

A still further object of my invention is to provide a heat blow gun of the above character, which will be durable and efficient in use, one that will be simple and easy to manipulate and one that will be light in weight and convenient to handle.

With these and other objects in view, the invention consists in the novel construction, arrangement and formation of parts, as will be hereinafter more specifically described and claimed and illustrated in the accompanying drawings, in which drawings, FIGURE 1 is a side elevational view of my improved heat gun with the heat confining pan connected therewith, the pan and adjacent parts being shown in cross-section, with the nozzle of the gun partly broken away to show the electrical heating unit with the nozzle, and FIGURE 2 is a bottom plan view of my improved device.

Referring to the drawing in detail, wherein similar reference characters designate corresponding parts throughout the several views, the letter B generally indicates my heat blow gun and the same includes a body 5 having a manipulating handle 6 at one end and an outlet head 7 at its opposite end, and preferably at right angles to the manipulating handle. The body 5 includes an electric motor 8 for driving an air impeller for forcing air through the outlet head 7. In accordance with my invention the outlet head 7 has secured thereto an elongated outlet nozzle 9, and the nozzle 9 has incorporated therein an electric heating unit 10. Thus, air forced through the nozzle 10 will be heated to the desired degree. The body 5 adjacent to the manipulating handle 6 is provided with an electric control switch 11.

The nozzle 9 enters centrally into a heat confining pan 12 and the pan 12 is connected to the nozzle 9 through the medium of a flexible joint 13, which will be later set forth.

The heat confining pan 12 can be of any desired configuration, but as illustrated, the same is of a square shape in plan. The pan includes a top wall 14 and depending side walls 15. The lower edges of the side walls can be rolled to provide a smooth flange or bead 16, if such should be desired. The walls are cut away at spaced points along their lower edges to provide air escape openings 17.

As stated the nozzle 9 enters centrally into the top of the pan and the pan is provided with an enlarged central opening 18 for receiving the nozzle.

The flexible joint connection 13 between the pan and nozzle can take various forms and for the purpose of illustration I have shown this connection to include upper and lower caps 19 and 20, which receive a smooth resilient packing such as asbestos 21, and this packing can be in the form of asbestos sheets. The walls of the opening 18 are received within the packing and the top wall extends into the packing and is supported thereby. The lower cap 20 is held in place by a cross-pin 22 and the upper cap 19 is held in place by an expansion coil spring 23. The lower end of the spring engages the outer face of the cap 19 and the upper end of the spring engages a washer 24 loosely fitted on the nozzle and held in place by a cross-pin 25. The packing is somewhat loose and resilient and is held in place resiliently by the spring 23 and thus the pan can give or slant in all directions.

From the description so far, it can be seen that the pan is placed against a surface at a desired point wherever high temperature heat is needed, and upon closing the circuit through the motor 8 and the resistance coil or electric heating unit 10, a hot blast of air will be delivered to the interior of the pan and this hot air will be distributed over the entire area of the pan and somewhat confined therein, but obviously the air can escape through the wall openings 17.

Where exceptionally high degrees of heat are desired or at winter time working outdoors, an electrical heating unit 26 can be carried directly by the pan. This unit is wound around porcelain or like studs 27 carried by the top wall 14 of the pan. If desired, the circuit for the heating unit 26 can be controlled by a separate switch or the same can be controlled by the same switch 11.

From the foregoing description, it can be seen that I have provided an efficient means for delivering hot, heated air to a localized point for any purpose, but particularly for boiling, blistering or heating paint to soften the same to permit the easy removal thereof from an old surface. The device is also particularly useful in heating asphalt tile and the like incident to laying a floor.

The pan can be formed from sheet metal and the entire unit is of light weight and can be easily manipulated by an operator, and the pan will conform itself to the inclination of a surface although the handle 6 may not be at direct right angles to the nozzle. The pan is pressed against the surface with a small force and no great pressure is needed.

In order to insure the desired rocking motion of the pan 12 in all directions, a concavo-convex washer 28 can be secured to the nozzle 9 and the wall of the opening in the pan 12 can be flanged upwardly on a radius, as at 29, to seat against said washer for a sliding rocking action.

Stress is laid on the fact that the flexible coupling 13 is disposed directly at the point of the entrance of the nozzle 9 into the pan 12 and that the pan rocks directly on the nozzle. This permits a desired thrust to be transmitted directly to the pan, but still permits the pan to flex to a limited extent on the nozzle. The nozzle itself extends a considerable distance into the pan for insuring the flow of heated air into the pan.

Changes in details may be made without departing from the spirit or the scope of this invention, but what I claim as new is:

1. A device for applying high temperature air to a surface comprising a blow gun including a manipulating handle and an outlet nozzle for air, an electrical heating unit within the nozzle past which the air travels, a heat confining pan having a top wall receiving the outlet end of the nozzle, and a flexible connection between the top wall of the pan and the nozzle, said flexible connection including upper and lower confining caps disposed respectively above and below the top wall, flexible packing material between the caps receiving and supporting the top wall of the pan, means retaining the lower cap on the nozzle, a stop confined on the nozzle above the pan, and an expansion spring coiled around the nozzle engaging the upper cap and the stop for normally holding the flexible packing material under tension and in said caps.

2. A mobile device for applying high temperature air to a surface for removing paint and the like therefrom comprising a substantially rectangular shaped heat confining pan including a top wall and outwardly extending peripheral side walls for engaging the surface to which the heat is being applied, a blow gun having an outlet nozzle extending into the pan a substantial distance through the top wall for conducting air into the pan, means for securing the pan directly to the nozzle, means for heating the air delivered by the blow gun, a handle on the blow gun for manipulating the gun and attached pan over the surface to which the heat is being applied, and said means connecting the pan directly with the nozzle being flexible whereby the pan can be swung on the nozzle to accommodate itself to the surface to which the heat is being applied.

References Cited in the file of this patent
UNITED STATES PATENTS

| | | |
|---|---|---|
| 1,707,554 | Hendry | Apr. 2, 1929 |
| 1,765,380 | McGinnis | June 24, 1930 |
| 1,787,251 | Jancke et al. | Dec. 30, 1930 |
| 2,150,720 | Mullooly | Mar. 14, 1939 |
| 2,597,215 | Wright | May 20, 1952 |
| 2,675,459 | Pace | Apr. 13, 1954 |
| 3,007,256 | Rouy | Nov. 7, 1961 |

FOREIGN PATENTS

| | | |
|---|---|---|
| 622,374 | Germany | Oct. 26, 1936 |
| 772,033 | Great Britain | Apr. 10, 1957 |